United States Patent [19]
Di Giusto

[11] Patent Number: 5,285,695
[45] Date of Patent: Feb. 15, 1994

[54] STEERING WHEEL AND DEFLECTION UNIT FOR A VEHICLE, IN PARTICULAR FOR A MOTOR VEHICLE

[75] Inventor: Nevio Di Giusto, Turin, Italy

[73] Assignee: Fiat Auto S.p.A., Turin, Italy

[21] Appl. No.: 945,953

[22] Filed: Sep. 16, 1992

[30] Foreign Application Priority Data

Sep. 17, 1991 [IT] Italy ............... TO91 U 000210

[51] Int. Cl.⁵ .................... G05G 1/04; H01H 3/16
[52] U.S. Cl. .................... 74/484 R; 74/525; 74/537; 74/531; 200/61.27; 200/61.54
[58] Field of Search ........... 74/484 R, 525, 527, 74/531; 200/61.27, 61.54

[56] References Cited

U.S. PATENT DOCUMENTS

| | | | |
|---|---|---|---|
| 1,176,077 | 3/1916 | Melton | 74/525 |
| 2,952,164 | 9/1960 | Hofgesang | 74/525 X |
| 3,464,288 | 9/1969 | Sheridan | 74/525 |
| 3,469,046 | 9/1969 | Johnson | 200/61.34 |
| 5,030,802 | 7/1991 | Noro | 200/61.27 |

*Primary Examiner*—Allan D. Herrmann
*Attorney, Agent, or Firm*—Ladas & Parry

[57] ABSTRACT

A steering wheel and deflection unit for a vehicle, in particular for a motor vehicle, is described, of the type in which a steering wheel is connected in an angularly rigid manner to a steering shaft and a control lever for a direction signalling device is supported radially in the vicinity of this steering wheel; the rest position of the control lever with respect to the steering wheel can be adjusted into a plurality of different angular positions.

5 Claims, 2 Drawing Sheets

STEERING WHEEL AND DEFLECTION UNIT FOR A VEHICLE, IN PARTICULAR FOR A MOTOR VEHICLE

BACKGROUND OF THE INVENTION

The present invention relates to a steering wheel and deflection unit for a vehicle, in particular a motor vehicle.

Steering wheel and deflection units are currently known in the prior art in which a control lever of a direction signalling device is supported radially in the vicinity of the steering wheel which is in turn connected in an angularly rigid manner to a steering shaft.

The engagement of the steering deflection device is controlled by a displacement of the control lever from an intermediate "rest" position between two operating positions to one of these two operating positions; the disengagement of the steering deflection device takes place automatically with the rotation of the steering wheel and therefore of the steering shaft: a mechanism mounted in an angularly rigid manner with respect to the steering shaft returns the control lever to the rest position.

In the rest position, the position of the lever with respect to the steering wheel is, however, fixed and cannot be personalized by vehicle drivers so that it meets their needs and matches their style of driving and the position of their hands on the steering wheel.

SUMMARY OF THE INVENTION

The object of the invention is to remedy the above drawbacks.

This object is achieved by the invention which relates to a steering wheel and deflection unit of the type comprising a steering wheel connected in an angularly rigid manner with a steering shaft, a control lever for a direction signalling device supported radially in the vicinity of the steering wheel and a steering deflection device, the engagement of which is controlled by an angular displacement of the lever from an intermediate rest position to one of two opposing operating positions and the disengagement of which is controlled by the rotation of the steering shaft which returns the control lever to the rest position, characterized in that it further comprises means for adjusting the rest position of the control lever into a plurality of different angular positions with circumferential respect to the steering wheel.

BRIEF DESCRIPTION OF THE DRAWINGS

The invention is set out in further detail in the following description of a non-limiting embodiment thereof made with reference to the accompanying drawings, in which.

DETAILED DESCRIPTION OF THE INVENTION

Figure 1:
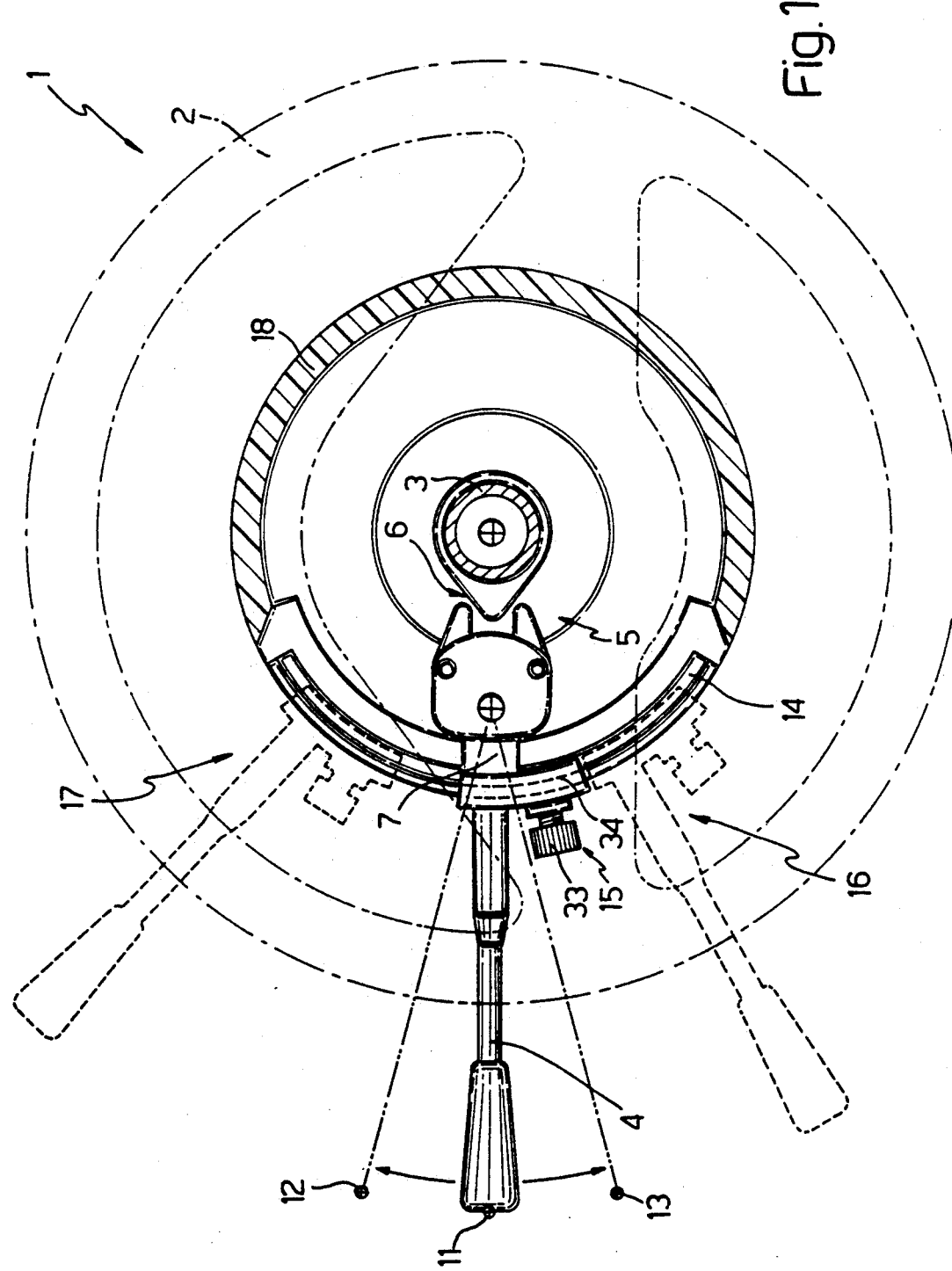
FIG. 1 is a rear frontal sectional view of a steering wheel and deflection unit for a vehicle of the invention.
Figure 2:
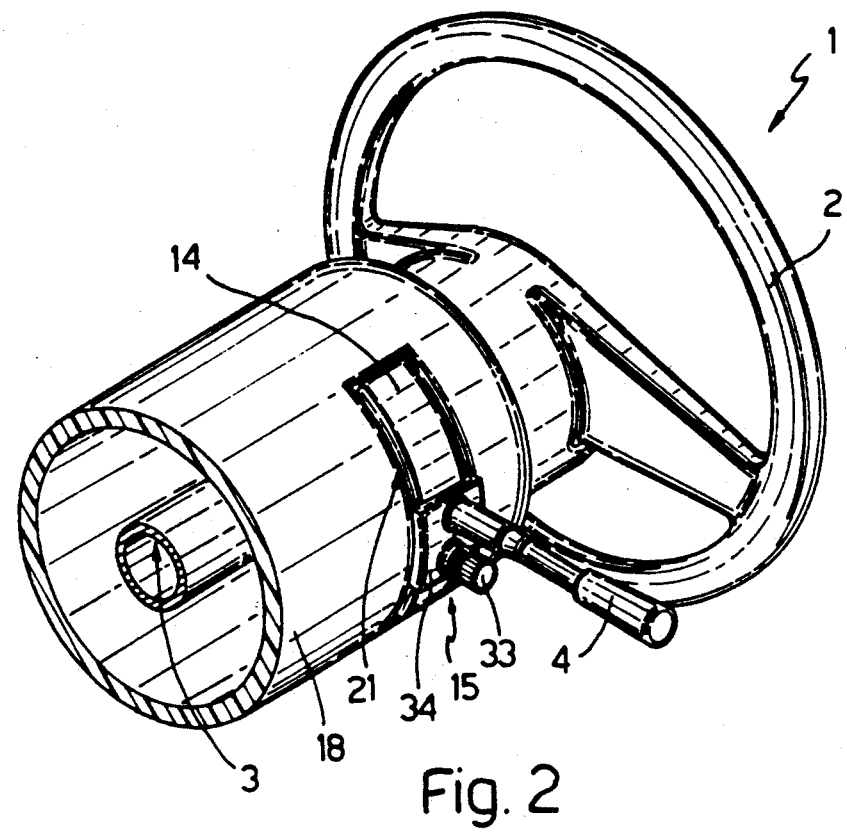
FIG. 2 is a lateral three-quarter elevation of the unit of FIG. 1.

With reference to FIGS. 1 to 4, a steering wheel and deflection unit for a vehicle, in particular a motor vehicle of a known type, is shown by 1.

The unit 1 essentially comprises a steering wheel 2, connected in an angularly rigid manner to a steering shaft 3, a control lever 4 for a direction signalling device (not shown in the drawings as its structure is known) disposed radially in the vicinity of the steering wheel 2 and a steering deflection device 5 in turn comprising a first member 6 angularly rigid with the steering shaft 3 and a shaft 7 angularly rigid with the control lever 4.

The engagement of the steering deflection device 5 is controlled by an angular displacement of the control lever 4 from an intermediate rest position 11 between two opposing operating positions 12 and 13 to one of these two positions 12 and 13.

The disengagement of the steering deflection device 5 takes place automatically, in a known manner, controlled by the rotation of the steering shaft 3 which, via the rigid rotation of the member 6, returns the control lever 4 from one of the two operating positions 12 or 13 to the rest position 11.

According to the invention, the shaft member 7 is disposed rigidly in a snap-locking manner with a circular sector 14 and the control lever 4 is mounted to slide on the circular sector 14 and is provided with a securing device 15 with respect to the sector 14.

In this way the control lever 4 may be selectively secured to the sector 14 in any of the intermediate positions between a first limit position 16 and a second limit position 17 shown in the drawing.

This allows the driver to dispose the control lever 4 of the direction indicators in the position which most suits his style of driving, thereby facilitating the driving of the vehicle.

The steering shaft 3 and the steering deflection device 5 are housed in an elongate housing 18, also known in the prior art as a "ham"; the control lever 4 projects radially in a snap-locking manner from a slot 21 provided in the housing 18, while the circular sector 14 is disposed at the location of this slot 21.

Figure 3:
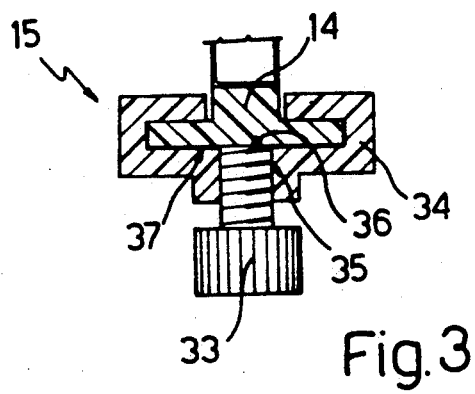
FIG. 3 is a sectional view of a first structural solution of the unit of FIG. 1.

With particular reference to FIG. 3, the securing device 15 comprises a tightening screw 33 and a frame 34 mounted to slide on the sector 14 and having a C-shaped cross-section which supports the control lever 4.

The screw 33 is screwed into a threaded through hole 35 provided in the frame 34 and cooperates at one end 36 in a sliding manner with an outer surface 37 of the circular sector 14, frictionally locking the frame 34, and thus the control lever 4, in a predetermined position with respect to the circular sector 14.

Figure 4:
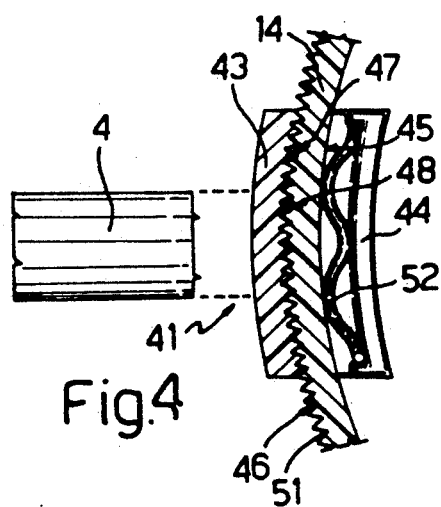
FIG. 4 is a sectional view of a second structural solution of the unit of FIG. 1.

In a structural variant shown in FIG. 4, without departing from the scope of the invention, the securing device 15 supporting the control lever 4 may, for instance, be formed by a frame 41 with a C-shaped cross-section having an outer wall 43 and an inner wall 44 disposed facing respective inner 45 and outer 46 surfaces of the circular sector 14.

An inner surface 47 of the outer wall 43 of the frame 41 is engaged by a serration of the "ribbed" type 48 in a corresponding serration 51 provided on the outer surface 46 of the circular sector 14, while a spring 52, disposed in abutment against the wall 44 of the frame 41 and the inner surface 45 of the sector 14 keeps the frame in the predetermined position.

In use, by pulling the control lever 4 radially outwards the spring 52 is compressed, while the serration 48 of the frame 41 is disengaged from the corresponding serration 51 provided on the sector 14 so that the frame 41 is free to be angularly positioned on the circular sector 14; once the position of the frame 41 is fixed with respect to the sector 14, leaving the lever 4 free to move, as a result of the spring 52, the serration 48 of the frame 41 engages the serration 51 of the sector 14, rigidly securing the frame 41 to the sector 14.

The advantages of the invention are evident from the above description: the possibility of being able selectively to position the control lever 4 of the steering deflection device 5 in an intermediate position between two end positions 16 and 17 makes it possible for the driver of the vehicle to dispose the lever 4 and to secure it in a very simple manner as a result of the device 15 in the position which most suits him; the assembly of the lever 4 on the circular sector by means of a sliding frame 34 also makes it possible to keep steering deflection devices already in use and known from the prior art unchanged.

I claim:

1. A steering wheel and deflection unit of the type comprising a steering wheel connected in an angularly rigid manner with a steering shaft, a control lever for a direction signalling device supported radially in the vicinity of the steering wheel and a steering deflection device, the engagement of which is controlled by an angular displacement of the lever from an intermediate rest position to one of two opposing operating positions and the disengagement of which is controlled by the rotation of the steering shaft which returns the control lever to the rest position, characterized in that it further comprises means for adjusting the rest position of the control lever into a plurality of different angular positions with circumferential respect to the steering wheel.

2. A steering wheel and deflection unit as claimed in claim 1, characterized in that the control lever is mounted to slide on a circular sector which is supported in an angularly rigid manner by a shaft of the deflection device.

3. A steering wheel and deflection unit as claimed in claim 2, characterized in that it further comprises means for securing the control lever to the circular sector in a predetermined angular position.

4. A steering wheel and deflection unit as claimed in claim 1,
    characterized in that the steering shaft and the steering deflection device are disposed within an elongate housing from which the control lever projects in a snap-locking manner.

5. A steering wheel and deflection unit as claimed in claim 4, characterized in that this lever projects in a snap-locking manner from the housing via a slot, the circular sector being positioned at the location of this slot.

* * * * *